(12) United States Patent
Fields, Jr. et al.

(10) Patent No.: US 7,143,226 B2
(45) Date of Patent: Nov. 28, 2006

(54) METHOD AND APPARATUS FOR MULTIPLEXING COMMANDS IN A SYMMETRIC MULTIPROCESSING SYSTEM INTERCHIP LINK

(75) Inventors: James Stephen Fields, Jr., Austin, TX (US); Michael Stephen Floyd, Austin, TX (US); Paul Frank Lecocq, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 11/055,847

(22) Filed: Feb. 11, 2005

(65) Prior Publication Data

US 2006/0184706 A1   Aug. 17, 2006

(51) Int. Cl.
*G06F 13/00* (2006.01)
*G06F 13/20* (2006.01)
*G06F 12/00* (2006.01)

(52) U.S. Cl. .................... 710/305; 710/51; 710/52; 370/916

(58) Field of Classification Search ............... 710/305, 710/315, 51, 52, 5, 240; 709/201, 250, 253; 711/211; 707/10; 718/101–103; 712/220; 370/916
See application file for complete search history.

(56) References Cited

U.S. PATENT DOCUMENTS

| 4,388,688 A | * | 6/1983 | Curlee et al. .................. 714/12 |
| 5,386,517 A | * | 1/1995 | Sheth et al. .................. 710/60 |
| 5,519,883 A | * | 5/1996 | White et al. ................. 710/315 |
| 2003/0023435 A1 | * | 1/2003 | Josephson .................... 704/235 |

OTHER PUBLICATIONS

"Omni Entertainment Control System (OECS) [for disabled persons]" by Lanz et al. (abstract only) Publication Date: Apr. 8-9, 1999.*

* cited by examiner

*Primary Examiner*—Gopal C. Ray
(74) *Attorney, Agent, or Firm*—Duke W. Yee; Thomas E. Tyson; Theodore D. Fay, III

(57) ABSTRACT

The present invention, a multiprocessor chip pervasive command interface, collects different types of pervasive commands into individual queues for each command type. As permitted by various grouping rules, valid commands are grouped together into one single command and placed on a functional interchip communications bus. This grouping of commands maximizes pervasive command bandwidth while the use of the functional bus minimizes the number of interchip connections.

20 Claims, 5 Drawing Sheets

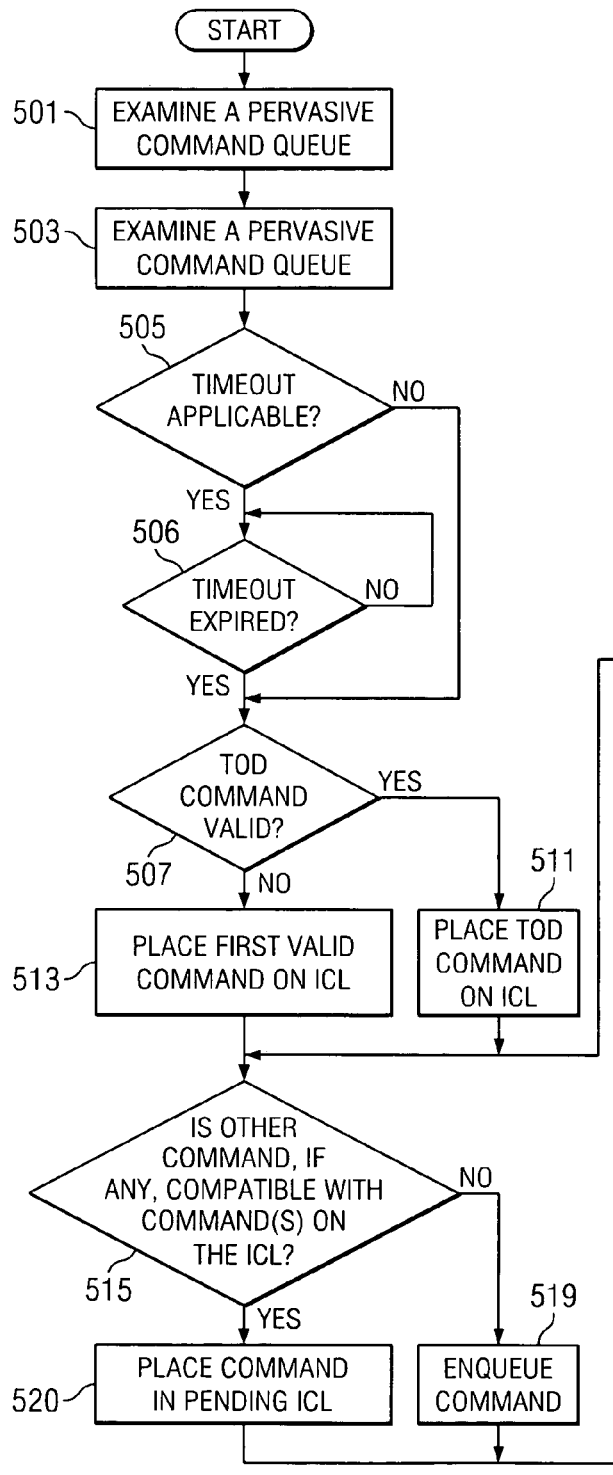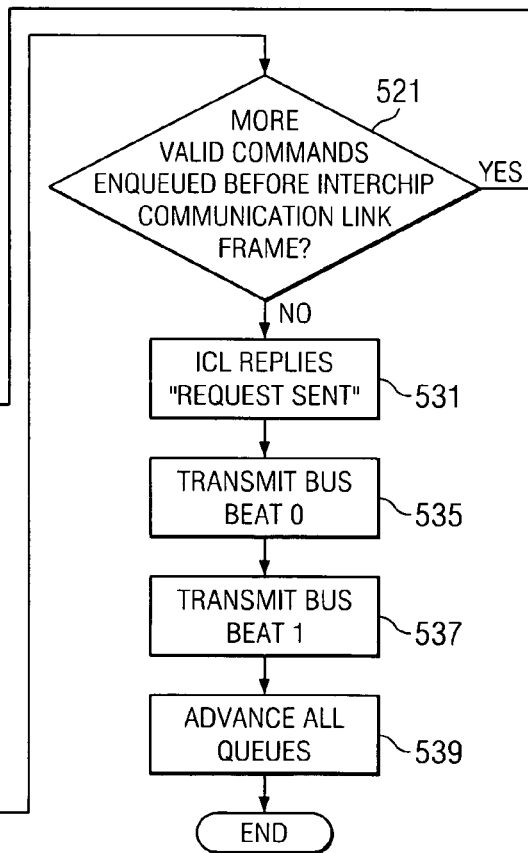
FIG. 5

METHOD AND APPARATUS FOR MULTIPLEXING COMMANDS IN A SYMMETRIC MULTIPROCESSING SYSTEM INTERCHIP LINK

BACKGROUND OF THE INVENTION

1. Technical Field

The invention relates to the field of multiprocessor systems, and more specifically placing commands on an interchip processor bus.

2. Description of Related Art

The basic structure of a conventional symmetric multiprocessor computer system 10 is shown in FIG. 1. Computer system 10 has one or more processing units arranged in one or more processor groups; in the depicted system, there are four processing units 12a, 12b, 12c and 12d in processor group 14. The processing units communicate with other components of system 10 via a system or interchip link bus 16. Interchip link bus 16 is connected to one or more service processors 18a, 18b, a system memory device 20, and various peripheral devices 22. A processor bridge 24 can optionally be used to interconnect additional processor groups. System 10 may also include firmware (not shown) which stores the system's basic input/output logic, and seeks out and loads an operating system from one of the peripherals whenever the computer system is first turned on (booted).

System memory device 20 (random access memory or RAM) stores program instructions and operand data used by the processing units, in a volatile (temporary) state. Peripherals 22 may be connected to interchip link bus 16 via, e.g., a peripheral component interconnect (PCI) local bus using a PCI host bridge. A PCI bridge provides a low latency path through which processing units 12a, 12b, 12c and 12d may access PCI devices mapped anywhere within bus memory or I/O address spaces. PCI host bridge 22 also provides a high bandwidth path to allow the PCI devices to access RAM 20. Such PCI devices may include a network adapter, a small computer system interface (SCSI) adapter providing interconnection to a permanent storage device (i.e., a hard disk), and an expansion bus bridge such as an industry standard architecture (ISA) expansion bus for connection to input/output (I/O) devices including a keyboard, a graphics adapter connected to a display device, and a graphical pointing device (mouse) for use with the display device.

In a symmetric multi-processor (SMP) computer, all of the processing units 12a, 12b, 12c and 12d are generally identical, that is, they all use a common set or subset of instructions and protocols to operate, and generally have the same architecture. As shown with processing unit 12a, each processing unit may include one or more processor cores 26a, 26b which carry out program instructions in order to operate the computer. An exemplary processor core includes the PowerPC™ processor marketed by International Business Machines Corp. which comprises a single integrated circuit superscalar microprocessor having various execution units, registers, buffers, memories, and other functional units, which are all formed by integrated circuitry. The processor cores may operate according to reduced instruction set computing (RISC) techniques, and may employ both pipelining and out-of-order execution of instructions to further improve the performance of the superscalar architecture.

Each processor core 12a, 12b includes an on-board (L1) cache (actually, separate instruction cache and data caches) implemented using high speed memory devices. Caches are commonly used to temporarily store values that might be repeatedly accessed by a processor, in order to speed up processing by avoiding the longer step of loading the values from system memory 20. A processing unit can include another cache, such as a second level (L2) cache 28 which, along with a memory controller 30, supports both of the L1 caches that are respectively part of cores 26a and 26b. Additional cache levels may be provided, such as an L3 cache 32 which is accessible via interchip link bus 16. Each cache level, from highest (L1) to lowest (L3) can successively store more information, but at a longer access penalty. For example, the on-board L1 caches in the processor cores might have a storage capacity of 128 kilobytes of memory, L2 cache 28 might have a storage capacity of 512 kilobytes, and L3 cache 32 might have a storage capacity of 2 megabytes. To facilitate repair/replacement of defective processing unit components, each processing unit 12a, 12b, 12c, 12d may be constructed in the form of a replaceable circuit board, pluggable module, or similar field replaceable unit (FRU), which can be easily swapped installed in or swapped out of system 10 in a modular fashion. A command unit is a generic term that includes, among others, processor cores, and the service processors (which may also be called flexible service processor).

It is axiomatic that the more parts there are to a device, the more opportunities there are to break one or more parts. Consequently, complex systems of microprocessors have relied on more commands being transported that are concerned, instead of with customer data, with error detection, system maintenance, reliability, accessibility and serviceability. Often these commands need be dispatched rapidly, in order to limit the impact of an error to certain parts of the system, and to rapidly reform and remedy the situation.

In systems where multiple microprocessors depend on a common bus to transmit commands, there is a problem that the limited bandwidth of the bus permits only simplex communication from a processor to one or more recipient processors. In other words, each processor needed to contend with other processors to use the interchip link bus. Moreover, a prior art single processor, with multiple commands, would need to queue such commands for iterative dispatch along the interchip link bus. It has become increasingly necessary to issue pervasive commands on the mainline or functional busses, rather than any the alternative slower specialized busses.

As the number of system-wide multi-chip pervasive functions grow, the ability to prioritize the additional interchip communication is important to handle such that the limited availability of the bus is maximized. Engineers now add a new function and require more inter-chip communication to accomplish it. The outcome is that chip I/O is increased, thus adding to chip size, complexity and as well as cost.

SUMMARY OF THE INVENTION

According to a preferred embodiment, the present invention, a multiprocessor chip pervasive command interface, collects different types of pervasive commands into individual queues for each command type. Each queue entry has a bit associated with it to indicate whether or not it is a valid command. As permitted by various grouping rules, valid commands are grouped together into one single command and placed on an interchip communications bus. The interchip communications bus has a frame when data may be placed on it. Upon the occurrence of that frame, the interface places all data from queues having a valid bit onto the interchip bus as a single command. The queues from which the valid commands are taken from are then advanced.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 shows a flow diagram for assembling omnibus commands from pervasive controls for transmittal and reception of an interchip link or fabric bus of a SMP.

DETAILED DESCRIPTION OF THE PREFERRED EMBODIMENT

One advantage shown by the present invention is to increase the number of commands that may simultaneously transit on an interchip link bus, particularly pervasive commands.

It is a further advantageous that the invention permit a programmed reversal of command priority, such that a functional command may be sent over the interchip link bus, while a pervasive command is held waiting.

Figure 1:
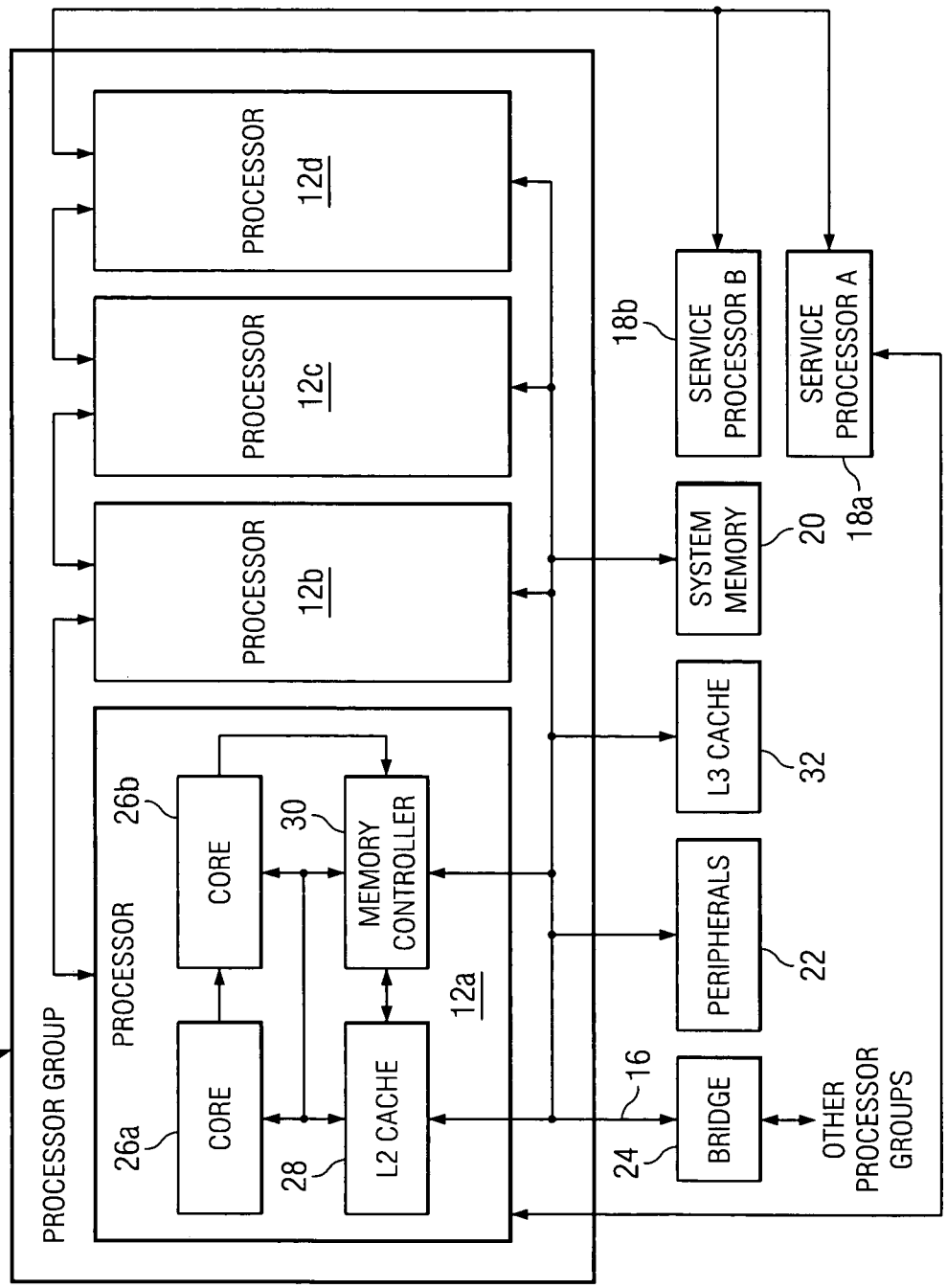
FIG. 1 is the basic structure of a conventional symmetric multi-processor computer system.
Figure 2:
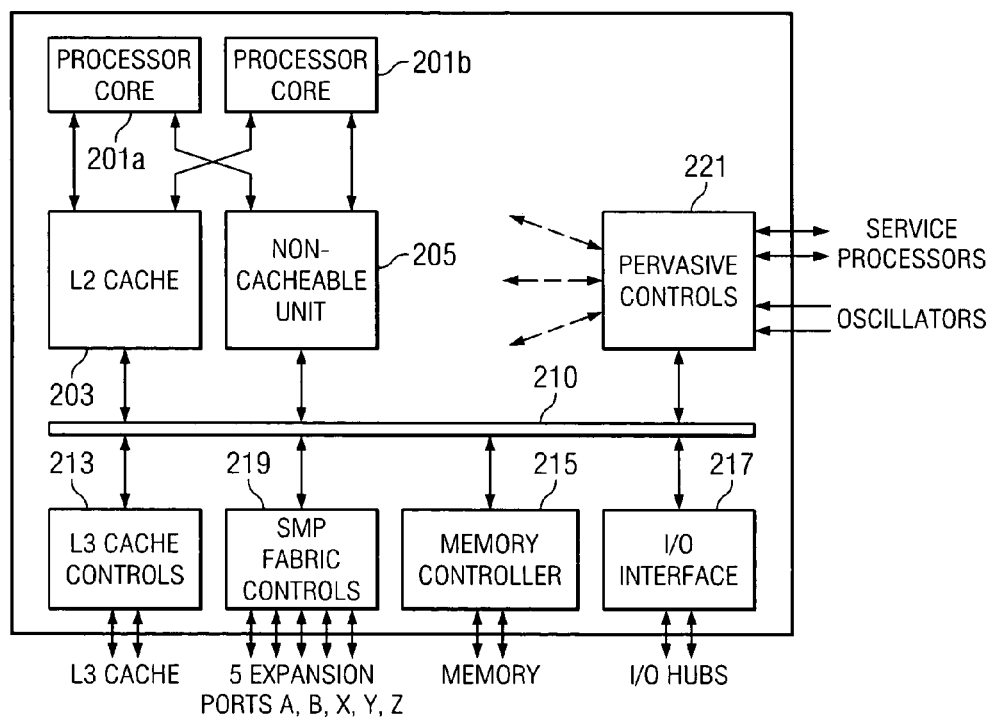
FIG. 2 shows a multi-processor chip of the present invention in block form.

FIG. 2 is a representative microprocessor or chip that may perform the functions of receiving and dispatching timing signals and occasionally recovering when soft errors occur. Chip 200 may have a first core processor 201a and a second core processor 201b. Each core processor may be simply referred to as a core. A core processor may have multithreading capability, error detection and recovery functions, numerous general purpose registers (GPR) and special purpose registers (SPR).

Connectivity of first core 201a and second core 201b may be with the level 2 cache 203 or L2, and the non-cacheable unit 205 or NCU. NCU 205 may handle commands to store data received from a core onto a fabric bus 210 for storage to main memory. Such stores may be memory-mapped i/o. Access to memory that may be susceptible to frequent accesses later may be stored to the L2 203 in order to reduce latency of operations performed by a core.

L2 203 may similarly provide access to its contents via the fabric bus 210 which may interconnect to other chips on the same board, and also beyond the board upon which the chip 200 is placed.

A nearby, but off-chip level 3 cache or L3 may be provided. Controls governing access between the cores and the L3 are in L3 cache control 213. Similarly, a memory controller 215, and an I/O interface 217 may be provided on-chip to facilitate long-latency access to general RAM and to various peripheral devices, respectively.

Symmetric multi-processor (SMP) fabric controls 219, is a special purpose device that mediates the contention for the fabric bus by the various attached devices, and provides for SMP topology configuration via expansion ports A, B, X, Y and Z. Five expansion ports are shown in the embodiment, however, it is understood that to achieve varying levels of complex multichip topologies, fewer or more expansion ports may be used. It is anticipated that five ports may provide 64 chips with rapid instruction, data and timing signals between and among them.

Pervasive controls 221 are circuits that exist both outside and mingled within the various processing blocks found on chip. Among the functions of pervasive controls is the providing of back-ups to the processor state on each core by providing redundant copies of various GPRs and SPRs of each core at convenient instruction boundaries of the each core processor. In addition pervasive controls may assist in the detection of errors and communication of such errors to an outside service processor for further action by, e.g. firmware.

Pervasive controls 221 are a gating point for redundant oscillators and other circuits which provide or receive derivative timing signals. It is appreciated that a fault, or other condition may remove one or more redundant oscillators from the configuration, and it is an object of the pervasive control to select the better timing signal (or at least one that is within tolerances) from among the redundant oscillators, and step-encoded signals that may arrive via the expansion ports. In addition, pervasive controls may form and issue commands through the interchip link bus or fabric bus, such as fabric maintenance operations, IO hotplug, and error indications, so called pervasive commands. The pervasive controls, however, share authority over the interchip link bus with other functional units of the chip, which may issue, from time to time functional commands, which may include memory reads, memory writes, cache-inhibited reads and cache-inhibited writes, among others.

Figure 3:
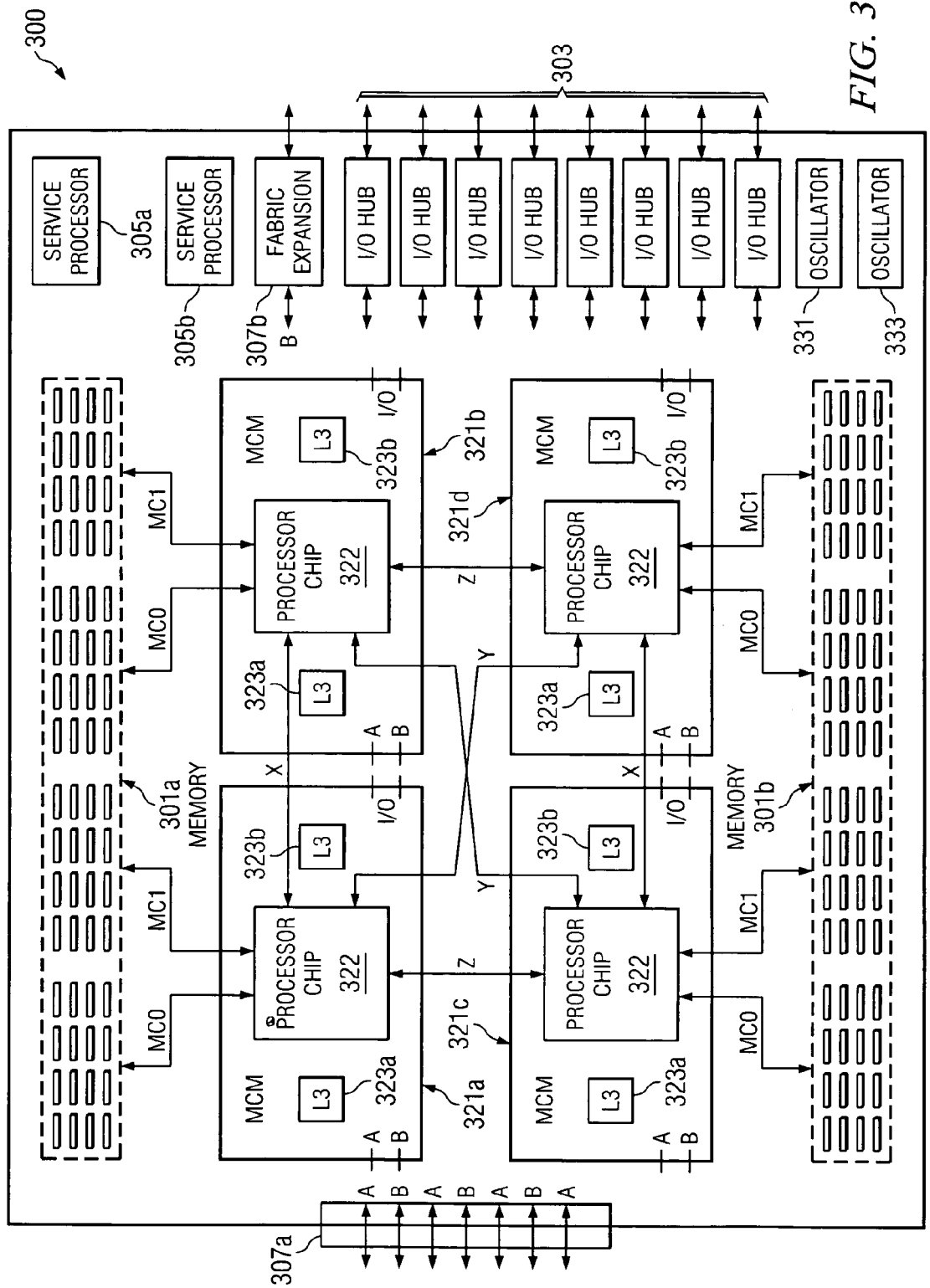
FIG. 3 shows a first embodiment physical configuration of the multi-processor chips in a symmetric multi-processor (SMP) arrangement on a circuit board.

FIG. 3 shows a first embodiment configuration of a symmetric multiprocessor using the chip of FIG. 2 in the form of a processor node 300. Processor node 300 may contain memory banks 301a, 301b, i/o hubs 303, service processors 305a, 305b, ports or connectors 307a and 307b handling the A and B ports from each of the multichip modules (MCM) 321a, 321b, 321c, and 321d. Each multichip module may be identical in its hardware configuration, but configured by software to have varying topologies and functions as, e.g. between master and slave functions. Within a MCM may be found the chip 322 of FIG. 2, as well as level 3 cache memory 323a and 323b. The processor node 300 may have a primary oscillator 331 and a secondary oscillator 333 that are each routed to each chip found on the processor node. Connections between the oscillators and functional units extend throughout the board and chips, but are not shown in FIG. 3 in order to limit clutter. Similarly, it is understood that many convoluted interconnects exist between the ports and I/O hubs, among other components—though such interconnects are not shown here.

The chips within a node are connected by a synchronous coherency fabric. The separate nodes are connected by an asynchronous coherency fabric, i.e. each node may have its own logic oscillator pair sourced on the node.

The master-slave relationship among the nodes is established by service firmware at initial program load, which among other things, sets up various configuration registers in each processor chip. The configuration registers may exist as two different sets, indicating two alternate topologies for the SMP wherein a primary control register set organizes the nodes by one topology (e.g. using a first node as a 'master') and another topology (secondary control register set) may use a second node as a 'master'.

A set of pervasive commands may permit the pervasive control of FIG. 2 to accomplish its varied functions. Table 1 depicts some of the commands and further shows whether various attributes may be applicable to the pervasive command. Some commands are broadcast, i.e. all chips that snoop on the interchip link bus receive the commands. Otherwise a command may be point-to-point, i.e. directed to a particular chip or core processor. Regardless of whether a command is a pervasive command or a functional command, existing as a single command or multiplexed together with others, all commands that exist on the interchip link bus are said to transit the interchip link bus.

An omnibus command may be a pervasive command that is transmitted on an interchip link bus, or it may be several pervasive commands that are transmitted in a collective set of bit fields that are transmitted via the interchip link bus in consecutive bus beats. An omnibus command may include a Time-of-day (TOD) pervasive command. An omnibus command may include a miscellaneous command, wherein one or more pervasive commands are present, but none are a TOD pervasive command. A miscellaneous command can include any number of broadcast commands that can be fit into the data space of a single omnibus command, but can only include one point-to-point command. Conversely, a point-to-point command can be combined with any number of broadcast commands, but may not be combined with another point-to-point command.

Since a TOD command from a pervasive control may be 64 bits wide, there may not be enough bits available in an address request to support transmittal in a single command. Therefore a TOD command, e.g. "send TOD value", may be split into two sub-commands, each sending 32 bits of TOD data at a time during an address bus beat of the fabric bus. Even though a TOD command is a broadcast command, in this embodiment it may not be combined with other commands since it requires the transmittal of a large amount of data and no other commands will fit into the same omnibus command.

Table 1 depicts each pervasive command and its attributes as a) broadcast among the chips; b) point-to-point to a single chip; c) able to combine with other broadcast commands; d) the number of fabric bus commands that may be required to transport the command. Each fabric bus command is 2 beats.

TABLE 1

Pervasive command attributes

| Command type | Broadcast | Point-To-Point | Able to combine | Number of Bus Commands |
|---|---|---|---|---|
| Time of Day synchronization | X | | | 2 |
| In-memory trace (HTM) global triggering | X | | X | 1 |
| Trace array global triggering | X | | X | 1 |
| Legacy Time Base enable | X | | X | 1 |
| XSCOM Status reporting | | X | X | 1 |
| Fabric Maintenance Operations | X | | X | 1 |
| Fabric and IO Hotplug | X | X | X | 1 |

TABLE 2 address bus beat 0 definition for a TOD command

| Bit | Description |
|---|---|
| 0:2 | Reserved ('000') |
| 3 | Bus beat: |
| | '0' = beat 0, the first 32 bits of TOD data will be transmitted; |
| | '1' = beat 1, the second 32 bits of TOD data will be transmitted |
| 4:35 | TOD data is transmitted |
| 36 | Reserved ('0') |
| 37 | Point to Point command toggle: |
| | '0' = broadcast command: all chips must respond to snoop request |
| | '1' = point to point command. Only chip selected with bits 38:43 of address bus beat 0 should resend to snoop request |
| 38:43 | Point to point destination chip ID (if applicable) |
| 44:49 | Fabric T-type. 0x3C for Pervasive Address Only Commands |
| 50:52 | Reserved ('000') |
| 53 | Address bus beat 0 parity |

TABLE 3 address bus beat 1 definition for a TOD command

| Bit | Description |
|---|---|
| 0:5 | Source Chip ID |
| 6:9 | Command Source Unit - '0xA' |
| 10 | Hotplug command valid |
| 11 | Fabric hotplug switch A/B registers |
| 12:16 | Reserved ('00000') |
| 17:20 | T-size - '0x8' |
| 21 | Error indication command valid |
| 22 | Global HTM command valid |
| 23 | Global Trace command valid |
| 24 | Fabric hotplug command valid |
| 25 | XSCOM status command valid (this command may appear with all others except Fabric Hotplug) |
| 26 | TOD status command valid |
| 27 | Time base enable command valid |
| 28:52 | Reserved |
| 53 | Address Bus Beat 1 parity |

Figure 4:
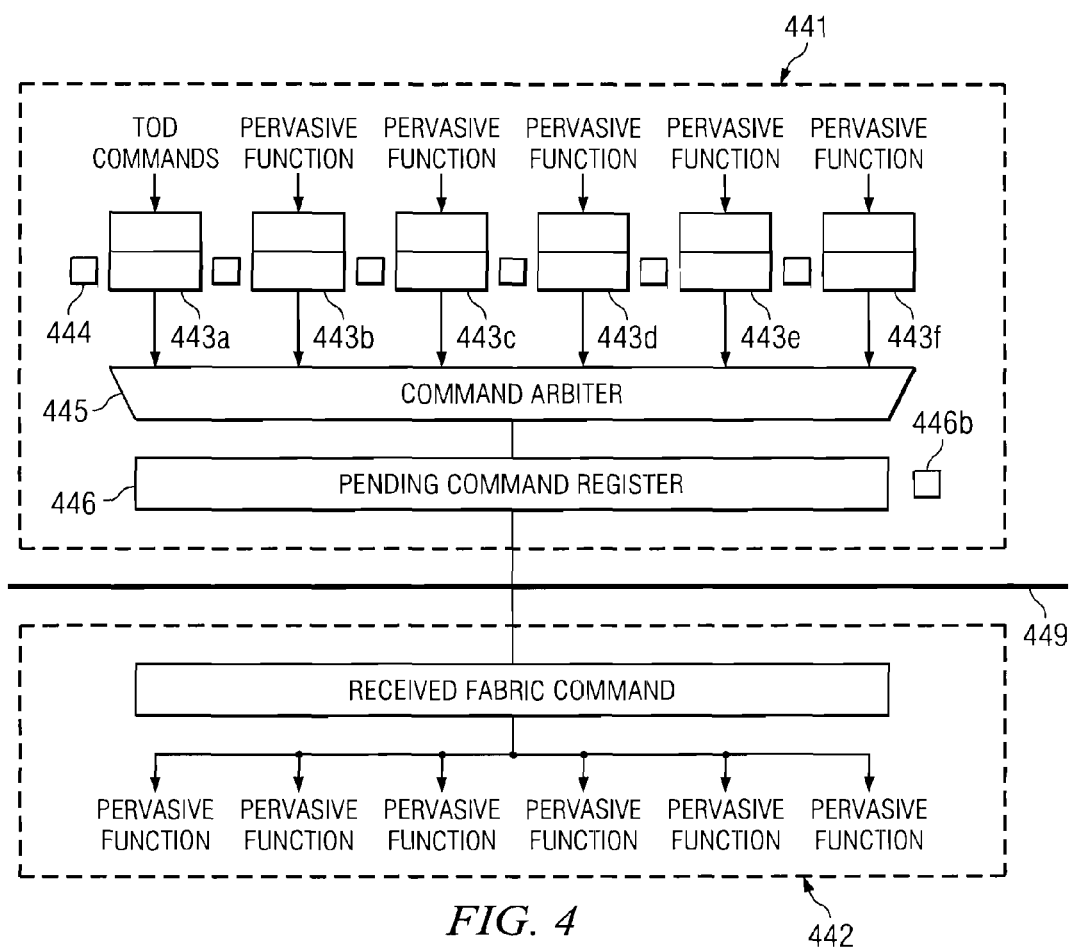
FIG. 4 shows a set of queues for staging pervasive commands prior to offloading the commands to an interchip link, and in addition, the chip interface logic for reading the interchip link to identify pervasive commands addressed to a chip.

FIG. 4 shows a pervasive command interface or pervasive control to the interchip link, which may be a interchip link bus of the symmetric multiprocessor system. Such a pervasive control may, for example transmit a TOD register value by using the TOD command structure, as organized in tables 2 and 3. A macro or send block 441 may be active in transmitting a TOD command, which may include a TOD register value. The macro may also be known as tp_fbc-_snd_pmac. The send block 441 may have TOD queue 443, which may be two deep, for accepting commands for later dispatch along the interchip link bus 449. Additional pervasive functions may have respective queues 443*b*, 443*c*, 443*d*, 443*e* and 443*f*, for staging commands concerning In-memory trace (HTM) global triggering, trace array global triggering, and IO hotplug pervasive commands, among others. A macro or receive block 442 also known as, tp_fbc_rcv_pmc, may exist on the chip to receive such pervasive commands as well.

Associated with TOD queue 443 may be a valid bit 444 to indicate to a command arbiter 445 that a command is available and stored as contents to the queue. When a valid command is in the command queue a request may be sent to the ICL 449 that a command is waiting to be sent. The ICL 449 will respond with a request sent signal or grant and the command is placed into the interchip link. When command arbiter 445 delivers a valid command to pending command register 446, a valid bit may be set 446b.

Each chip has a tp_fbc_rcv_pmc macro or receive block 442 that snoops the fabric line for pervasive commands that are broadcast or point-to-point addressed to the chip. Each pervasive command has a unique command type, or ttype, that indicates to the snooping logic that it is a pervasive command. In this embodiment that ttype is 0x3C.

Referring to FIG. 4 and FIG. 5, FIG. 5 shows flow diagram of steps that may occur when a TOD command or other pervasive command arrives at the send block 441. Each queue may receive pervasive commands from various specialty macros of the pervasive control block of FIG. 2. Each queue may be a two position queue, and may initially be empty or without valid data. Thus each command may arrive and depart at a queue in typical first in first out fashion. The first step, once a queue obtains a command, is the embodiment examines (step 501) the command that is a Time-Of-Day (TOD) command on TOD queue 443, and examines a next-lower-priority pervasive command (step 503) from a queue among queues 451a, 451b, 451c, 451d and 451e, if a TOD command is not available. In many cases, a timeout (step 505) will not be applicable, since we may want pervasive commands to have high priority access to the interchip link bus. If such is the case, execution continues to determine (step 507) if a TOD command is among the one or more pervasive commands obtained. If the yes branch is taken, then the TOD command may be marked valid, so that it may be immediately susceptible to placing on the interchip communications link (step 511). If the no branch is taken, then the first examined pervasive command marked as valid is placed in the pending command register 446 for the next frame of the interchip communications link (ICL) (step 513). The data stored in the pending command register 446 is known as the pending command. Next it is decided if the secondary command (from step 503) is compatible with the command already queued for the ICL frame (step 515). If so, the command is placed (step 520) in the pending command register with the command already queued for the next ICL frame occurrence, and its queue entry is marked invalid. If not, the command is left in its command queue (step 519), wherein the queue may be any of the queues 443b, 443c, 443d, 443e, and 443f, and left marked valid so that it will be available to be added to the next command to be placed on the ICL. Note that the effort of marking valid, or marking invalid, may simply involve setting or resetting a latch associated with the data to be considered either valid or invalid.

A determination is made to see if another pervasive command has arrived at the head of a queue before a ICL frame has occurred (step 521). If so, and the new command is compatible with the commands already present in the pending ICL command, the additional command is added to the ICL command in queue (step 515). Each queue head is examined iteratively, until the last one is reached, and all compatible commands are either added to the pending ICL command or left valid for the next available command. When the ICL frame arrives, the pending command is loaded into the ICL and the fabric gives a "request sent" signal (step 531).

The interchip link bus transmits an initial set of data in bus beat 0 (step 535), and then a second set of date in bus beat 1 (step 537). Collectively, during the bus beats, the interchip link bus may transmit several pervasive commands at once. Once the bus beat 1 transmittal (step 537) is complete, the embodiment may advance (step 539) each queue that had its head vacated when the command formerly contained therein had been placed on the pending command register 446 of the ICL.

At the decision point to determine if a command is compatible with existing commands, table 1, shows the rules used. Moreover, if two commands of the same type arrive, the first of the two commands is not compatible with the second of the two commands, since the two commands are assigned the same bit fields for data transport. In addition, two commands that are point-to-point may not be compatible, for example, not all pervasive commands are compatible with a XSCOM status reporting. A fabric and IO hotplug command is not compatible with an XSCOM status reporting.

In addition to a TOD command, the present invention may transmit a miscellaneous command. Like the TOD command, the miscellaneous command may transport several pervasive commands among the bit fields of the miscellaneous command, provided that no two commands that are point-to-point are multiplexed together into the same omnibus command. The field structure of a pair of bus beats is shown in table 4 and table 5 which represent the condition of bits in a miscellaneous type of omnibus command.

TABLE 4

Address bus beat 0 bit definition for Miscellaneous Command

| Bit | Description |
| --- | --- |
| 0:2 | Reserved ('000') |
| 3 | Core 0 malfunction alert |
| 4 | Core 1 malfunction alert |
| 5 | Recoverable interrupt |
| 6 | Start HTM |
| 7 | Stop HTM |
| 8 | Pause HTM |
| 9 | Freeze HTM |
| 10 | Reset HTM |
| 12:21 | HTM mark type, valid with Mare HTM, bit 11 of beat 0 |
| 22:23 | HTM mark source: 20 = core ID; 21 = thread ID |
| 24 | HTM mark dropped |
| 25 | Global trace start |
| 26 | Global trace stop |
| 27 | Global trace bank |
| 28 | Global trigger 0 |
| 29 | Global trigger 1 |
| 30 | XSCOM Error |
| 31 | XSCOM Address not acknowledged |
| 32 | XSCOM command aborted |
| 33 | XSCOM Command initiated by core 0 |
| 34 | XSCOM command initiated by core 1 |
| 35 | Time base enable set |
| 36 | Timebase enable clear |
| 37 | Point to point command:<br>'0' = broadcast command: all chips respond to snoop request;<br>'1' = point to point command: only chip selected with bits 38:43 of address bus beat 0 respond to snoop request |
| 38:43 | Point to point destination chip ID |
| 44:49 | Fabric t-type = '0x3C' for pervasive address only commands |

TABLE 4-continued

Address bus beat 0 bit definition for Miscellaneous Command

| Bit | Description |
|---|---|
| 50:52 | Reserved ('000') |
| 53 | Address bus beat 0 parity |

TABLE 5

Address bus beat 1 bit definition for Miscellaneous Command

| Bit | Description |
|---|---|
| 0:5 | Source chip ID |
| 6:9 | Command source unit, which may be '0xA' |
| 10 | Hotplug command valid |
| 11 | Fabric Hotplug switch A and B registers |
| 12 | Fabric initialize (broadcast mode only) |
| 13:16 | Reserved ('00000') |
| 17:20 | T-size, which is '0x8' for all commands |
| 21 | Error indication command valid |
| 22 | Global HTM command valid |
| 23 | Global HTM command valid |
| 24 | Fabric Hotplug command valid |
| 25 | XSCOM status command valid |
| 26 | TOD command valid |
| 27 | Timebase enable command valid |
| 28:52 | Reserved |
| 53 | Address bus beat 1 parity |

The purpose of the timeout loop (step 506), for those cases where a timeout may be set to operate, is to provide a time during which the lower priority functional commands may also access the interchip link bus, without being preempted by pervasive commands. A determiniation that pervasive commands are lower priority, as compared to functional commands, causes the yes branch of the timeout applicable (step 505) to be taken. During the times that that the flow of FIG. 5 experiences a timeout loop, another routine may seize the interchip link bus and dispatch functional commands. Giving priority to the dispatch of functional commands over pervasive commands is called applying a timeout.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for multiplexing pervasive commands in a multiprocessor system having a first microprocessor and a second microprocessor, wherein the first microprocessor has at least two pervasive command queues, and the first microprocessor communicates to a second microprocessor via an Interchip Communications Link (ICL) comprising the steps of:
examining a time-of-day (TOD) pervasive command at a first queue;
examining a second pervasive command at a second queue;
placing the TOD command into a pending command register to form a pending command;
detecting a frame on the ICL in response to placing the TOD command into the pending command register; and
transmitting the pending command on the ICL.

2. The method for multiplexing pervasive commands of claim 1 further comprising the steps of:
advancing the TOD command queue in response to transmitting the pending command on the ICL.

3. The method for multiplexing pervasive commands of claim 1 further comprising the step of:
detecting that pervasive commands are low priority; and
applying a timeout after examining the second pervasive command at the second queue.

4. The method for multiplexing pervasive commands of claim 3 wherein the step of applying a timeout comprises applying a timeout of duration sufficient for at least one frame to occur on the ICL.

5. A method for multiplexing pervasive commands in a multiprocessor system having a first microprocessor and a second microprocessor, wherein the first microprocessor has at least two pervasive command queues, and the first microprocessor communicates to a second microprocessor via an interchip link (ICL) comprising the steps of:
placing in a pending command register a first pervasive command at a first queue, wherein the first pervasive command is not a time-of-day command;
placing in a pending command register a second pervasive command at a second queue, wherein the second pervasive command is a broadcast command but not a time-of-day (TOD) command; and
transmitting the first pervasive command and the second pervasive command on the ICL, wherein the ICL carries the first pervasive command simultaneously with the second pervasive command.

6. The method for multiplexing pervasive commands of claim 5 wherein the step of placing in a pending command register a second pervasive command is followed by an interchip frame occurrence.

7. The method for multiplexing pervasive commands of claim 6 wherein the step of placing in a pending command register a second pervasive command is followed by placing in a pending command register a third pervasive command, wherein the third pervasive command is a broadcast command but not a TOD command and the placing occurs before the interchip frame occurrence, and the transmitting of the first pervasive command and the second pervasive command on the ICL includes transmitting the third pervasive command on the ICL.

8. The method for multiplexing pervasive commands of claim 5 wherein the step of placing in a pending command register a first pervasive command is preceded by a determination that pervasive commands have priority higher than functional commands.

9. The method for multiplexing pervasive commands of claim 5 further comprising the steps of advancing the first queue and advancing the second queue in response to transmitting the first pervasive command and the second pervasive command on the ICL.

10. The method for multiplexing pervasive commands of claim 5 wherein the step of placing in a pending command register a first pervasive command is preceded by a determination that pervasive commands have a priority lower than functional commands.

11. The method for multiplexing pervasive commands of claim 10 further comprising the step of applying a timeout following placing in a pending command register a second pervasive command.

12. The method for multiplexing pervasive commands of claim 11 wherein the step of applying a timeout comprises applying a timeout of duration sufficient for at least one frame to occur on the ICL.

13. A command arbiter for multiplexing pervasive commands in a multiprocessor system having at first microprocessor and a second microprocessor, wherein the first microprocessor has at least two pervasive command queues, and the first microprocessor communicates to a second microprocessor via an interchip link (ICL) comprising:
a means for placing in a pending command register a first pervasive command at a first queue, wherein the first pervasive command is not a time-of-day command;
a means for placing in a pending command register a second pervasive command at a second queue, wherein the second pervasive command is a broadcast command but not a time-of-day (TOD) command; and
a pending command register for transmitting the first pervasive command and the second pervasive command on the ICL, wherein the ICL carries the first pervasive command simultaneously with the second pervasive command.

14. The command arbiter for multiplexing pervasive commands of claim 13 wherein the means for placing in a pending command register a second pervasive command includes a means for waiting for an interchip frame occurrence.

15. The command arbiter for multiplexing pervasive commands of claim 14 wherein the means for placing in a pending command register a second pervasive command includes a means for placing in a pending command register a third pervasive command, wherein the third pervasive command is a broadcast command but not a TOD command and the placing occurs before the interchip frame occurrence, and the pending command register for transmitting of the first pervasive command and the second pervasive command on the ICL includes a means for transmitting the third pervasive command on the ICL.

16. The command arbiter for multiplexing pervasive commands of claim 13 wherein the means for placing in a pending command register a first pervasive command further comprises a means for determining that pervasive commands have priority higher than functional commands.

17. The command arbiter for multiplexing pervasive commands of claim 13 further comprising a means of advancing the first queue and advancing the second queue in response to the pending command register transmitting the first pervasive command and the second pervasive command on the ICL.

18. The command arbiter for multiplexing pervasive commands of claim 13 wherein means for placing in a pending command register a first pervasive command further comprises a means to determine that pervasive commands have a priority lower than functional commands.

19. The command arbiter for multiplexing pervasive commands of claim 18 further comprising a means for applying a timeout following placing in a pending command register a second pervasive command.

20. The command arbiter for multiplexing pervasive commands of claim 19 wherein the means for applying a timeout comprises applying a timeout of duration sufficient for at least one frame to occur on the ICL.

* * * * *